(12) United States Patent
Krishnakumar et al.

(10) Patent No.: US 8,867,013 B2
(45) Date of Patent: Oct. 21, 2014

(54) SYSTEM AND METHOD FOR MEASURING VIDEO QUALITY DEGRADATION USING FACE DETECTION

(75) Inventors: Anjur S. Krishnakumar, Princeton, NJ (US); Bengi Karacali-Akyamac, Bridgewater, NJ (US)

(73) Assignee: Avaya Inc., Basking Ridge, NJ (US)

( * ) Notice: Subject to any disclaimer, the term of this patent is extended or adjusted under 35 U.S.C. 154(b) by 81 days.

(21) Appl. No.: 13/588,637

(22) Filed: Aug. 17, 2012

(65) Prior Publication Data

US 2013/0194434 A1 Aug. 1, 2013

Related U.S. Application Data

(60) Provisional application No. 61/591,019, filed on Jan. 26, 2012, provisional application No. 61/614,617, filed on Mar. 23, 2012.

(51) Int. Cl.
*H04N 17/00* (2006.01)

(52) U.S. Cl.
USPC .......................... 349/180; 348/189; 348/192

(58) Field of Classification Search
USPC ......... 348/192, 180–184, 189, 190, 193–194, 348/518, 519; 455/67.1, 67.3, 67.7, 69; 382/293–295, 279
IPC ...................................................... H04N 17/00
See application file for complete search history.

(56) References Cited

U.S. PATENT DOCUMENTS 6,496,221 B1 * 12/2002 Wolf et al. .................... 348/192
7,668,397 B2 * 2/2010 Le Dinh et al. .............. 382/275
7,705,881 B2 * 4/2010 Okamoto et al. ............. 348/180
8,508,597 B2 * 8/2013 Bourret et al. ............... 348/192
8,520,075 B2 * 8/2013 Bhagavathy et al. ......... 348/180

OTHER PUBLICATIONS

Genius Voice | Video Manager website, http://www.netscout.com/products/enterprise/nSAS/ngenius_analysis/Pages/nGenius_Voic . . ., Retrieved Aug. 17, 2012, 2 pages.
Tao Liu et al., "Real-Time Video Quality Monitoring for Mobile Devices," Dialogic Research, Inc., Paper appeared in Conference Mar. 17-19, 2010, 6 pages.
Video Quality Measurement Algorithms: Scaling IP Video Services for the Real World, www.brixnet.com, Copyright © 2006 Brix Networks, Inc., 8 pages. The year of publication is sufficiently earlier than the effective U.S. filing date and any foreign priority date so that the particular month of publication is not in issue.
Bill Reckwerdt, "Case Study: Real-Time Video Quality Monitoring Explored," www.videoclarity.com, 7 pages. Last accessed Aug. 17, 2012.
Nitin Suresh et al., "Real-Time Prototype of a Zero-Reference Video Quality Algorithm," Paper appeared in Conference Jan. 9-13, 2008, 2 pages.

* cited by examiner

*Primary Examiner* — Trang U Tran
(74) *Attorney, Agent, or Firm* — Maldjian Law Group LLC; John Maldjian; Alexander D. Walter

(57) ABSTRACT

System and method to detect video quality degradation in a video stream received by a telecommunications endpoint, the method including: locating reference features characteristic of content in the received video stream; calculating reduced reference features from the located reference features; receiving reduced reference features of a transmitted video stream, the transmitted video stream corresponding to the received video stream; calculating a distance between the reduced reference features in the received video stream and the reduced reference features of the transmitted video stream; and detecting video quality degradation when the calculated distance exceeds a predetermined threshold.

20 Claims, 6 Drawing Sheets

100

Video Call 4 with Random Loss

Video Call 4 with Burst Loss

SYSTEM AND METHOD FOR MEASURING VIDEO QUALITY DEGRADATION USING FACE DETECTION

CROSS-REFERENCE TO RELATED APPLICATIONS

This application claims the benefit of U.S. Provisional Patent Application Ser. No. 61/591,019, filed on Jan. 26, 2012, and the benefit of U.S. Provisional Patent Application Ser. No. 61/614,617, filed on Mar. 23, 2012, the entire content of which are hereby incorporated by reference in its entirety.

BACKGROUND

1. Field of the Invention

Embodiments of the present invention generally relate to detection of degraded quality of a video transmission, and, in particular, to a system and method for using face detection to detect degraded video quality.

2. Description of Related Art

Improving and maintaining high video quality during adverse network conditions is important for wide deployments of video over IP networks that inherently lack end-to-end quality of service ("QoS") guarantees. Application-layer quality assurance is typically achieved by monitoring video quality in real-time, detecting degradation, and taking appropriate action when quality drops. A key step in the process, detection of video quality degradation in real-time, requires light-weight video quality metrics that can be computed with low computational overheads and communicated to the sending side with small transmission overheads.

While some video quality metrics are known in the background art, a standard metric that accurately reflects user opinion with a level of overhead that is appropriate for real-time monitoring and QoS assurance is not known.

Video quality measurement techniques known in the background art fall under three main areas: Full-reference, reduced-reference, and no-reference techniques. In full reference techniques, the original video sequence is compared to the received distorted video sequence using image processing techniques. Hence, full reference techniques require access to both the original transmitted and the received video sequences. The measurements are taken at the media layer and are typically computationally intensive. As a result, these techniques are not suitable for real-time (i.e., in-service) video quality monitoring. Peak Signal to Noise Ratio ("PSNR") is one of the earliest full-reference metrics. It focuses on the strength of the video signal with respect to noise injected during lossy compression. Among other full-reference techniques are Perceptual Evaluation of Video Quality ("PEVQ") and Structural Similarity Index.

Reduced reference techniques extract various features from both the original and the distorted video sequences and compare the extracted features of the original and the distorted images to each other. Measurements are taken at the media layer. While the comparison of only the extracted features reduces the computational overhead, it may still be computationally intensive to extract the features from the source video. Additionally, the extracted features of the original sequence need to be sent across the network and synchronized to the received frame for in-service monitoring. As such, the reduced features typically incur notable transmission overheads for real-time operations. Video Quality Metric ("VQM") is a reduced-reference algorithm developed by the Institute for Telecommunication Sciences ("ITS"). Part of VQM is incorporated into ITU-T J.144. Transmitting the extracted VQM features incur significant overhead for in-service monitoring.

No-reference techniques use only the received distorted image. These techniques can be pixel-based or bitstream-based and are more suitable for both in-service monitoring and off-line network assessment of video quality. Pixel-based techniques involve media layer measurements. Using image processing techniques, the pixel-based techniques look for known distortions in the images to assess quality. However, the pixel-based techniques cannot handle video sequences with unanticipated distortions. In addition, the pixel-based techniques cannot distinguish between impairments due to the network or impairments already in the original video sequence.

Bitstream-based no-reference techniques are computationally lighter since they do not require decoding. Measurements are taken at the bitstream layer. These techniques rely on a Mean Opinion Score ("MOS") function that maps parameters from the bitstream to video quality. Once the MOS function is known, assessment of video quality is computationally simple since measurements taken at the bitstream layer and the mapping to video quality is light-weight. However, an accurate MOS function that covers all or a majority of possible distortions and conditions must be determined upfront. Furthermore, any such MOS function needs to account for error concealment capabilities of the decoder. Hence bitstream-based techniques are often tied to a specific decoder. VQmon is an example of a video quality metric that inspects the bitstream to monitor application performance in real-time.

Video quality depends at least in part on the error concealment capabilities of a video decoder. A uniform level of packet loss presented to various video decoders may result in varying levels of quality among the video decoders. Hence, video quality metrics based on packet level measurements are specific to the decoder used. Other video quality metrics such as PSNR and VQM, in which measurements are taken at the media layer, are decoder-agnostic, i.e., the metrics are relatively independent of the decoder used. However, PSNR and VQM are not suitable for real-time (i.e., in-service) operations due to computational and transmission overheads.

Therefore, a need exists to provide computationally lightweight video quality evaluation tool, operable over a variety of video decoders, in order to provide detection of video impairments, and ultimately improved customer satisfaction.

SUMMARY

Embodiments of the present invention generally relate to video impairments, and, in particular, to a system and method for using face detection as a video quality metric, thereby exploiting characteristics of video content in applications such as video conferencing, which often includes relatively few speakers and a relatively low amount of motion. In such applications, motion is concentrated mainly around the face, making the face an area of interest. Errors in facial regions are more likely to be noticed by subjective users. Embodiments in accordance with the present invention use a novel error measurement metric that focuses on a box surrounding the faces. Embodiments in accordance with the present invention may measure how the location of the box differs between sent and received frames under network degradation.

The difference in box location between sent and received frames is a lightweight indicator (i.e., an indicator that is not resource intensive to compute), in contrast to a comparison of the contents of the boxes, which is relatively more resource intensive to compute. Resources may include processing time, memory usage, transmission-related costs, and so forth. The difference in box location should detect problems with the quality of service that are severe enough to warrant corrective action. For example, if the difference in box locations shows that a face has been found in the wrong place, by more than a de minimus amount, then the difference is an indication of a severe problem.

Embodiments in accordance with the present invention may provide a method to detect video quality degradation in a video stream received by a telecommunications endpoint, the method including: locating reference features characteristic of content in the received video stream; calculating, by use of a processor, reduced reference features from the located reference features; receiving reduced reference features of a transmitted video stream, the transmitted video stream corresponding to the received video stream; calculating, by use of a processor, a distance between the reduced reference features in the received video stream and the reduced reference features of the transmitted video stream; and detecting video quality degradation when the calculated distance exceeds a predetermined threshold.

Embodiments in accordance with the present invention may provide a system to detect video quality degradation in a video stream received by a telecommunications endpoint, the method including: a location module configured to locate reference features characteristic of content in the received video stream; a processor configured to calculate reduced reference features from the located reference features; a receiver configured to receive reduced reference features of a transmitted video stream, the transmitted video stream corresponding to the received video stream; a processor configured to calculate a distance between the reduced reference features in the received video stream and the reduced reference features of the transmitted video stream; and a detector configured to detect video quality degradation when the calculated distance exceeds a predetermined threshold.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
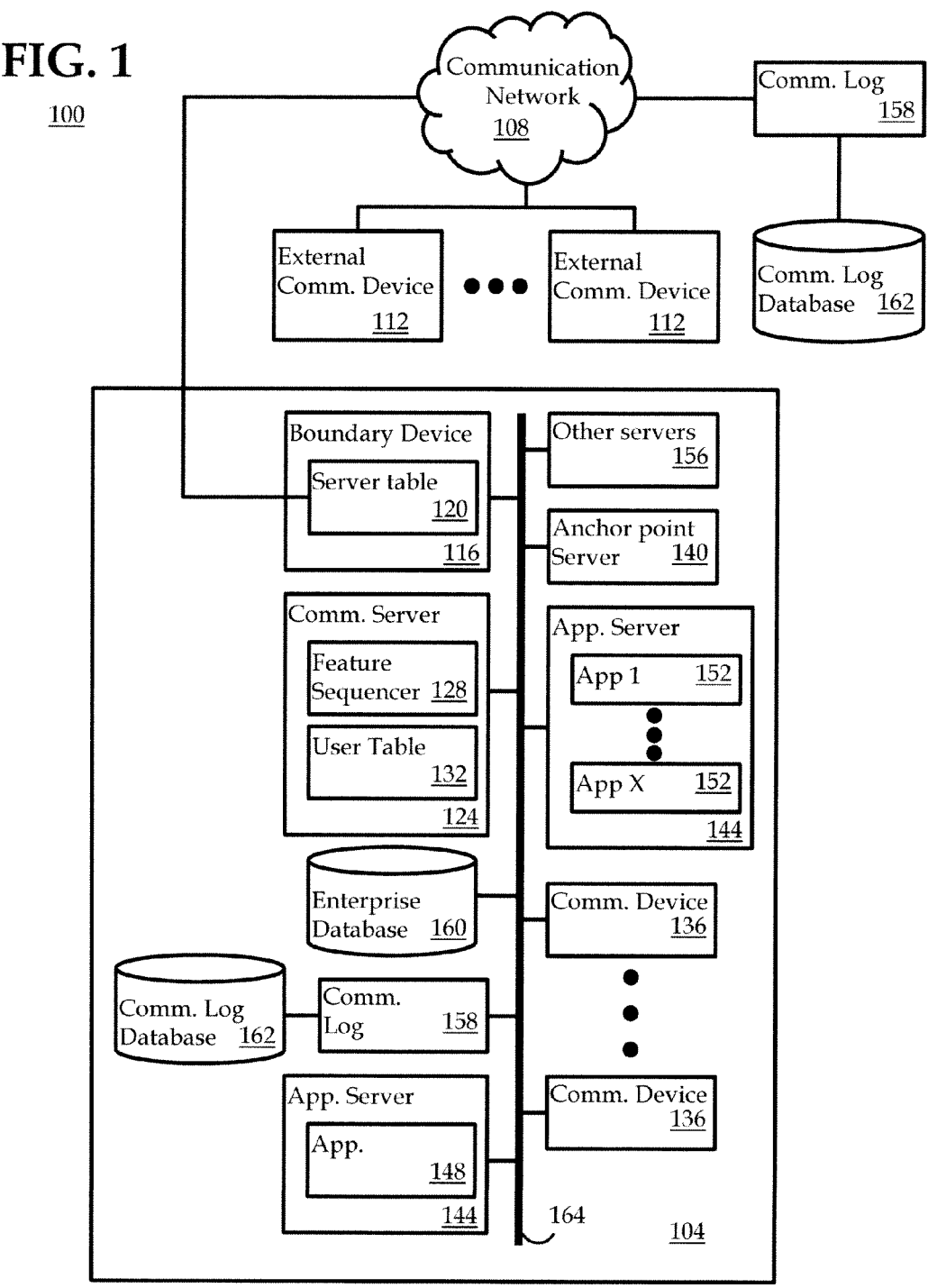
FIG. 1 is a block diagram depicting a communication system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize computationally-light methods to detect video degradations.

The exemplary systems and methods of this disclosure will also be described in relation to video conferencing software, modules, and associated video conferencing hardware. However, to avoid unnecessarily obscuring the present disclosure, the following description omits well-known structures, components and devices that may be shown in block diagram form, are well known, or are otherwise summarized.

Embodiments in accordance with the present invention address the problem of detecting video quality degradation in real-time (in-service) to ensure end-to-end video quality in times of adverse network conditions by taking appropriate counter-measures. Such quality of service ("QoS") assurance mechanisms require light-weight video quality metrics that can be implemented with low computational and communication overheads. Embodiments herein describe a novel video quality metric for video conferencing-type applications that is accurate and light-weight for real-time operations.

Ensuring end-to-end video quality may require the monitoring of quality in real-time (in-service) and taking counter-measures in times of adverse network conditions. Such application-layer QoS assurance mechanisms may require light-weight video quality metrics that can be implemented with low computational and communication overheads.

Embodiments in accordance with the present invention provide a novel video quality metric for video conferencing-type applications that better reflects user opinion at least as to quality, and is light-weight for real-time operations. Embodiments in accordance with the present invention may operate by exploiting the characteristics of the video content in such applications, i.e. few speakers with limited motion. A performance metric, Simplified Perceptual Quality Region ("SPQR"), relies on detecting the location of a speaker's face in sent and received video frames and comparing the locations between the corresponding frames in the two streams to identify discrepancies as a sign of video quality degradation.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 depicts a communication system 100 which may be usable with an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server

124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Embodiments in accordance with the present invention provide a novel video quality metric, Simplified Perceptual Quality Region ("SPQR"), which can be used for real-time quality assurance of video conferencing-type applications. SPQR is similar to full-reference video quality metrics such as PSNR and VQM in accuracy, as determined by how well the metric correlates with user opinion of video quality, while incurring less computational and transmission overhead. SPQR may exploit certain characteristics of video content in such video conferencing-type applications, i.e., video conferences having few speakers with limited motion.

SPQR is less computationally or resource-usage intensive compared to methods in the background art. SPQR is usable with a variety of video codecs. SPQR does not require complete frame synchronization, but instead processes sent and received video frames ordered by presentation times. Embodiments in accordance with the present invention may operate under the assumption that the sent and received frames are re-synchronized every few minutes using presentation timestamps.

Since SPQR uses decoded frames in the computation, SPQR takes into account decoder-specific error concealment capabilities. SPQR relies on detecting the location of a speaker's face in sent and received video frames, as determined by the calculated location of a box that encloses the detected face, and comparing the box locations between the corresponding frames in the two streams to identify discrepancies as a sign of video quality degradation. The calculated box locations from the transmitting and/or receiving endpoints may then be transmitted to a predetermined analytic location for processing (e.g., to the transmitting side, to the receiving side, to an intermediate point such as a central server, etc.). An intermediate point may be, e.g., Application 148 in Application Server 144 of FIG. 1. Transmission of box locations incurs minimal overhead or burden because of the relatively small amount of data involved compared to the video stream itself. SPQR may be computed at an intermediate server or at one of the endpoints using a stream of the calculated box locations and associated timestamps provided by the sending and receiving endpoints.

Detecting the location of the speaker's face in video frames, by a comparator such as a comparator module in a telecommunications endpoint or a comparator application executed by application server 144 of FIG. 1, is a process that ordinarily should be completed quickly (i.e., less than a second), and incur small computational overhead. A separate reliable channel such as a TCP/IP channel may be used to transmit the reduced reference features (i.e., box locations that frame identified faces) in-service (i.e., during the teleconference), to the predetermined analytic location.

Another advantage of embodiments in accordance with the present invention is that by focusing on video conferencing-type applications, face locations in consecutive frames are not likely to change drastically. Therefore a relatively low-grade sampling rate (i.e., less than the full frame rate of the video signal, for instance at one or two frames per second) is sufficient for use by SPQR. When low-grade sampling is conducted, full-reference or reduced reference techniques may also be used in real-time for such applications. For example, PSNR may be used in real-time if a full frame (i.e., a decoded frame in its entirety) is transmitted to the receiver at the rate of one frame per second via, e.g., a separate reliable channel. The separate reliable channel (e.g., TCP/IP channel) may not support sufficiently strict timing requirements for content delivery to support real-time video conferencing, but will be adequate to support the reduced information used by SPQR.

However, even for such low-grade sampling, transmitting a full frame may incur a significant transmission overhead, such as when the number of participants in a conference increases. With SPQR, only the box locations need to be transmitted, rather than a full frame, in order to implement an application-layer QoS assurance mechanism.

Embodiments in accordance with the present invention have been tested in order to obtain empirical results of the goodness of the SPQR metric.

Testing of embodiments involved 50 short video calls, each of approximately 90 seconds, which were subjected to varying levels and patterns of packet loss. In each case, embodiments in accordance with the present invention successfully detected video quality degradation. SPQR scores were compared to PSNR scores and VQM scores, both of which are widely used video quality metrics that are not suitable for real-time monitoring. VQM takes subjective user opinion into account and therefore may be considered to be an improvement over PSNR.

Empirical results, including experimentation testing and empirical study, indicate that SPQR scores correlate with both PSNR and VQM scores. For example, VQM scores were computed for five seconds of video for the 50 video calls that were tested. PSNR and SPQR scores were compared to VQM scores. Linear modeling of VQM scores of each video call using SPQR yielded a median R2 goodness of fit value of 0.9. Similarly, using PSNR values to model the VQM scores over five seconds yielded a median R2 goodness of fit value of 0.93. Furthermore, accuracy of sampling SPQR at the sub-second level (e.g., 1 or 2 frames per second) was evaluated at least with respect to the $R^2$ goodness of fit, and it was shown that 1 fps sampling models VQM scored well over five seconds.

Video quality using SPQR may be computed for a pair of sent and received video streams on a frame by frame basis. Frames in each video stream are ordered by their presentation time, but the video frames in each stream are not necessarily strictly synchronized with each other. Synchronization of sent and received video streams should be sufficient for analysis purposes such that the difference in content between the sent and received video streams is ordinarily relatively minor over the synchronization time difference. For frames in each stream, embodiments in accordance with the present invention compute a list of x and y coordinates corresponding to the box locations (e.g., coordinates of the lower left corner of the box) encapsulating the faces found in the frame. In some embodiments, a width and height of one or more boxes may also be computed. Face detection is performed using processes known in the art. Embodiments compare a list of box coordinates in a received frame to a list of box coordinates in the corresponding sent frame, correspondence being established by relative order when frames are ordered by presentation timestamps, in order to determine the difference in box locations between the sent and received frames. For a sent frame with m coordinates and a received frame with n coordinates, embodiments compute m×n pair-wise distance values.

Let $(x_s, y_s)$ and $(x_r, y_r)$ be a pair of sent and received coordinates, respectively. Embodiments in accordance with the present invention may compute SPQR in accordance with Equation (1), where $d_{max}$ is a diagonal resolution size. A lower value for SPQR indicates better quality. A sent and received video frame without detectable errors an SPQR value of zero.

$$SPQR = \frac{\log\left(\sqrt{(x_s - x_r)^2 + (y_s - y_r)^2}\right)}{\log(d_{max})} \quad (1)$$

Alternatively, other embodiments in accordance with the present invention may compute SPQR by use of an expression other than that of Equation (1), such that the computed value of SPQR increases as $|x_s-x_r|$ and/or $|y_s-y_r|$ increases. For example, SPQR may be summed over all faces detected in both video streams, or differences in the x-axis and y-axis may be given unequal weighting, or the logarithm may not be used or may be computed over the entire quotient, and so forth. If multiple faces are present in the sent and received video stream, embodiments may be able to correctly associate a received detected face with the corresponding sent detected face. A penalty may be applied to the computed SPQR if the number of faces is different in the received video stream compared to the sent video stream.

Embodiments in accordance with the present invention match faces found in received frames to faces found in sent frames, by selecting pairs of coordinates with minimum distances between them. Face detection software, due to inherent limitations of known processes, may find more or fewer faces than are actually present in the video. If the number of speakers is known to be k, then up to k such distance values are selected pertaining to each face found in the frame. In cases where a face is not detected in a sent frame, SPQR is not defined. In cases where a face is detected in the sent frame but not in the received frame, SPQR is set to 1. For some sent video streams, the number of faces may change abruptly, for example if the video stream is a panel discussion of, e.g., three panelists, and the video changes rather frequently between a close-up of one speaker and a more distant view of the entire panel. During such abrupt changes in the sent video stream, synchronization errors between the sent and received video streams may cause temporary, transient spikes in the computed SPQR if left uncompensated. Such transients may be handled using methods known in the art so as to minimize the effect on SPQR, such as by averaging over s sliding time window, or by ignoring an SPQR greater than a threshold level which lasts less than a predetermined duration of time (e.g., the synchronization error).

Difference in facial box locations between the sent and received frames happen for at least two reasons: First, network problems may cause degradation in the received frames such that the face detection algorithm finds a face in different parts of the sent and received frames. Second, loss of frame synchronization may cause frames with different video content to be matched. In the second case, the received frame may not be degraded, yet the SPQR value will be non-zero since the faces will be in different locations. Such SPQR values will indicate the aftermath of a major problem that has resulted in frame loss. Frame loss may be mitigated by adopting a policy of resynchronization at predefined intervals of time using presentation timestamps.

Figure 2A:
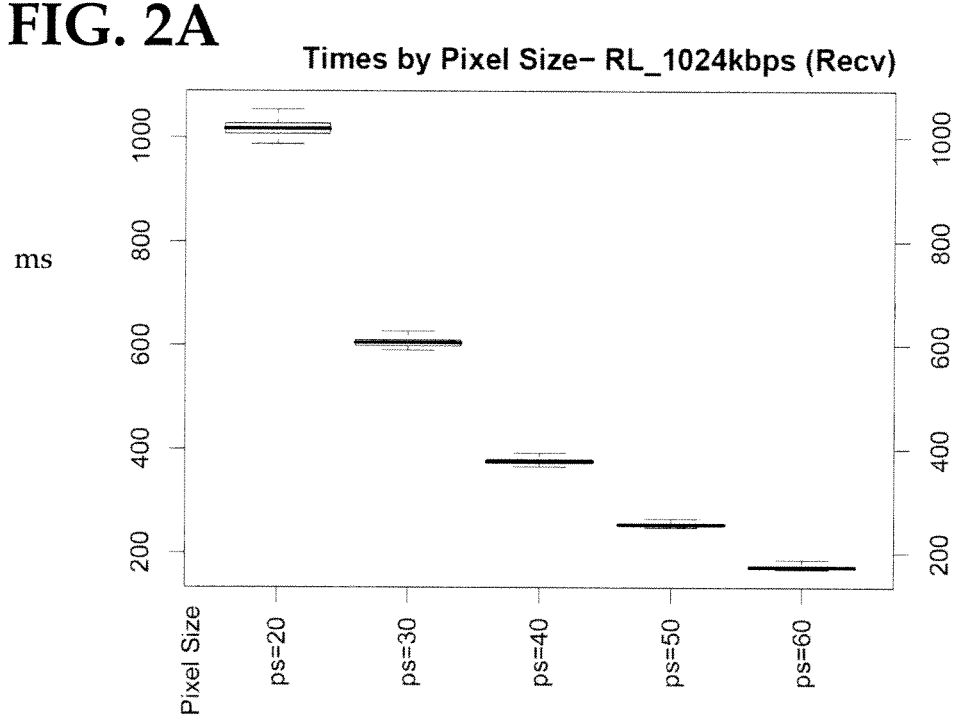
FIG. 2A illustrates exemplary face detection times as a function of pixel size for random packet losses in a received video stream, in accordance with an embodiment of the present invention.
Figure 2B:
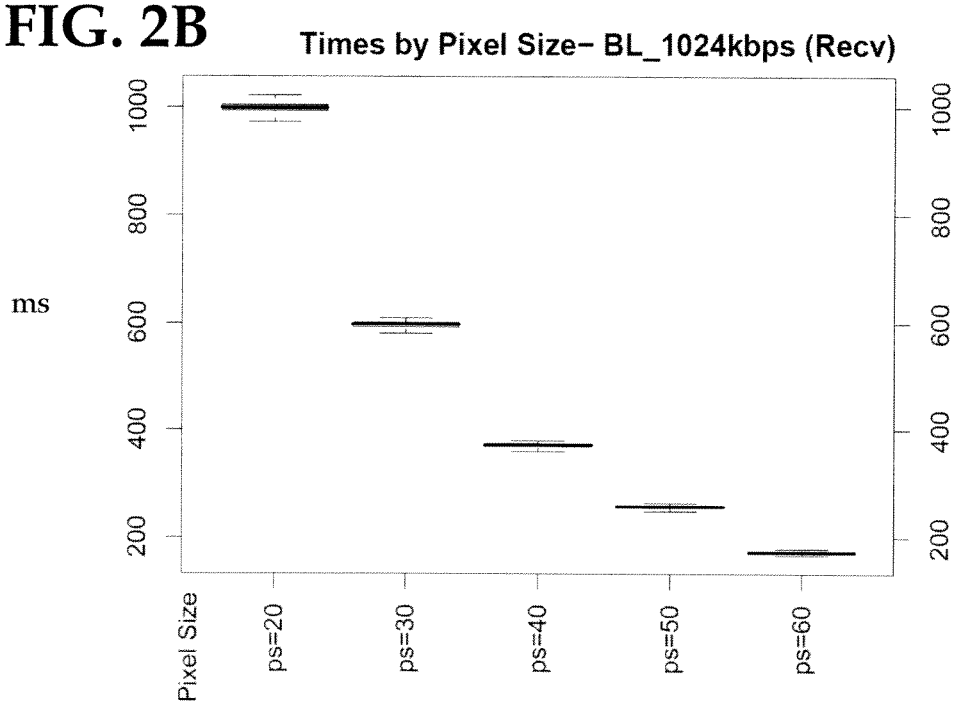
FIG. 2B illustrates exemplary face detection times as a function of pixel size for burst packet losses in a received video stream, in accordance with an embodiment of the present invention.
Figure 2C:
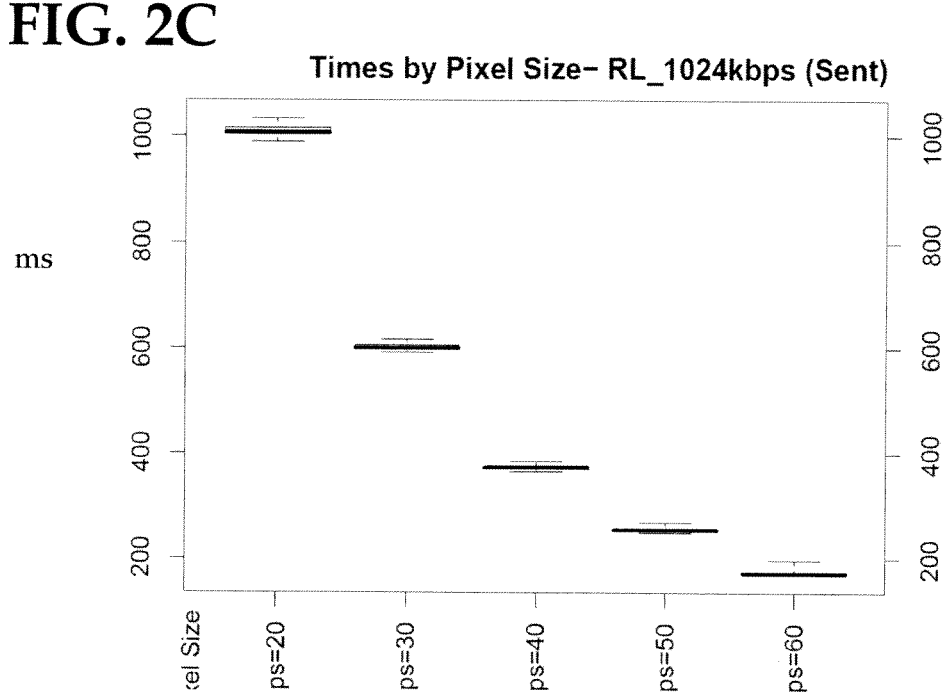
FIG. 2C illustrates exemplary face detection times as a function of pixel size for random packet losses in a sent video stream, in accordance with an embodiment of the present invention.
Figure 2D:
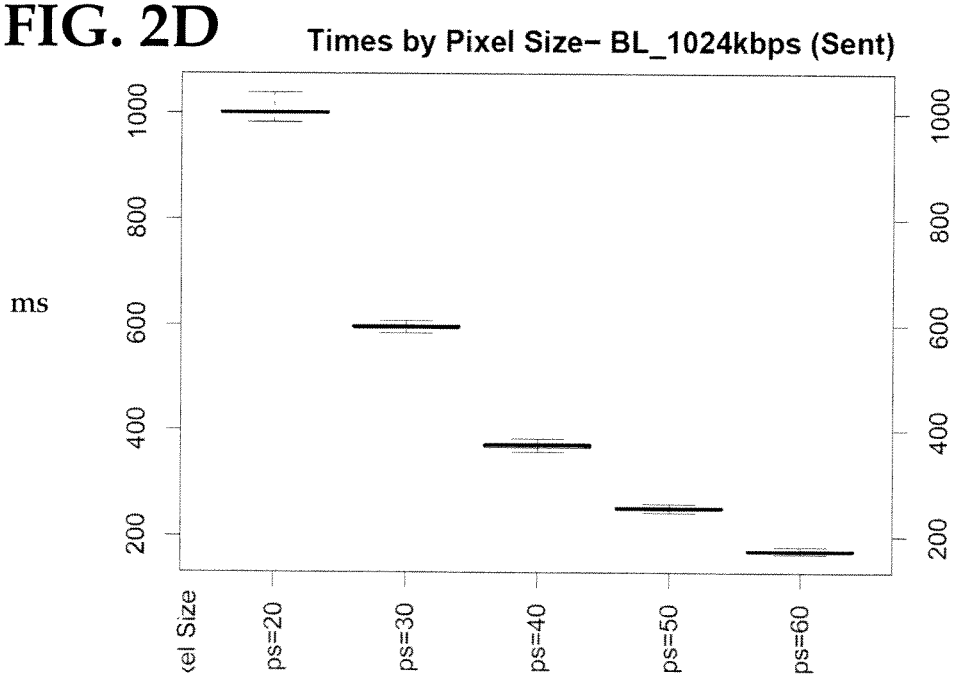
FIG. 2D illustrates exemplary face detection times as a function of pixel size for burst packet losses in a sent video stream, in accordance with an embodiment of the present invention.

Experimental results were obtained using a testbed employing Open Source Computer Vision ("OpenCV"), which is known as an available library of programming functions for real time computer vision. The testbed described herein used OpenCV to detect face locations in the frames. The testbed provided Four Times Common Intermediate Format ("4CIF", 704×576) video frames in jpeg format to the software for processing in accordance with an embodiment of the present invention. A smallest region on which the face detection algorithm operates is referred to as a pixel. The pixel size is an important factor in the runtime of the face detection algorithm. The testbed was operated with pixel sizes of 20, 30, 40, 50, and 60 and measured the runtime of the face detection algorithm, however the method is not limited in this respect and other pixel sizes or non-square rectangular pixel sizes may be used. FIGS. 2A-2D show the exemplary face detection times by pixel sizes. FIGS. 2A and 2B illustrate exemplary results for a received video stream, and FIGS. 2C and 2D illustrate exemplary results for a sent video stream. FIGS. 2A and 2C illustrate exemplary results for a random loss, and FIGS. 2B and 2D illustrate exemplary results for a burst loss. The Y-axis is in units of milliseconds. Each boxplot shows the distribution of face detection time for a given pixel size. The median is marked with a bold line, the box extends from the 25th to the 75th percentile, and the whiskers mark the minimum and the maximum values. The median face detection times for pixel sizes of 20, 30, 40, 50, and 60 are 1014.48, 604.22, 375.88, 256.29, and 173.50 ms, respectively. pixel sizes were found to provide more accuracy at the cost of increased runtime. Hence, the number of frames in which a face was detected decreases by increasing pixel size. In the frames considered, using pixel size of 60 missed 1.64% of the faces detected using pixel size of 20.

SPQR was empirically evaluated using the Avaya one-X Communicator, in order to determine how well SPQR detects video quality degradation. SPQR was compared to video quality metrics appropriate for offline testing, namely, VQM and PSNR. The impact of low-grade sampling of SPQR values on detecting video quality degradation was evaluated.

A testbed for the empirical evaluation used two video endpoints connected through a network and a linux bridge. Video calls using H.264 codec at 1024 kbps, 25 fps, and 4CIF resolution were communicated between these endpoints. Video transmission in one direction was studied, after signaling was complete and video transmission started. Packet loss impairments were injected to the call path through the linux bridge using the linux netem utility. Fifty video calls of approximately 90 seconds each were studied, and subjected to varying levels of degradation. In each call, network packet loss was injected after 20 seconds into a call, such that half of the calls were subjected to random packet loss in the range of 1%-10%, and the other half of the calls were subjected to burst packet loss in which the loss duration was selected randomly from the range of 50 ms-150 ms. In particular, every five seconds a complete packet loss for a randomly selected duration was injected. RTP packets carrying video payload were captured at both video endpoints. Video payloads were extracted using the VideoLan client ("VLC") player and ffmpeg utility. "ffmpeg" is known in the art as a fast video and audio converter that can also grab from a live audio/video source. "ffmpeg" can also convert between arbitrary sample rates and resize video on the fly with a high quality polyphase filter. Individual frames were extracted for each video call. In each video call approximately 2,000 video frames were considered.

Figure 3A:
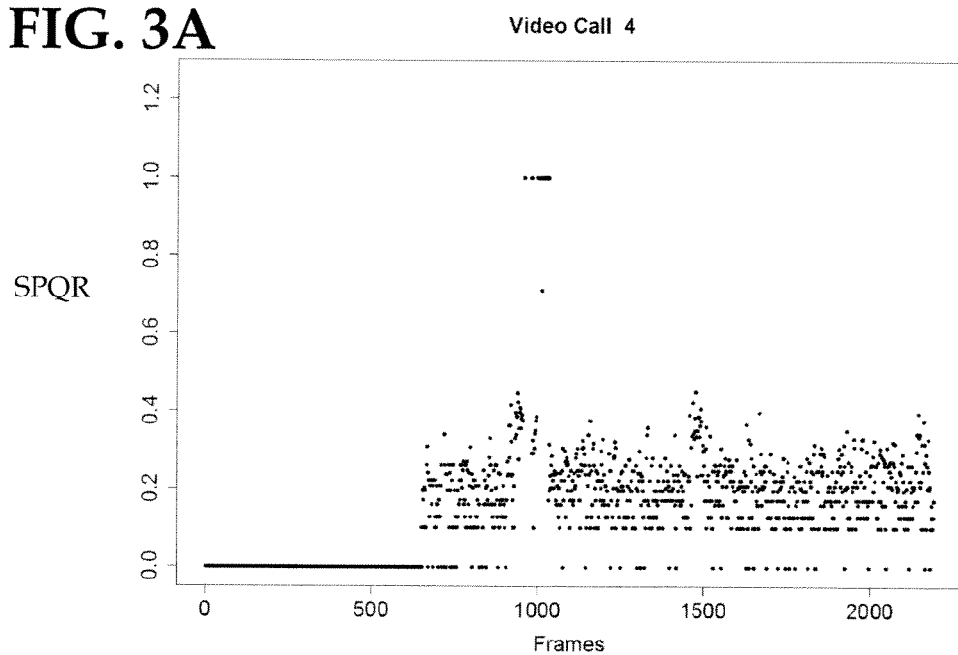
FIG. 3A illustrates exemplary SPQR over time for random packet losses induced in a received video stream, in accordance with an embodiment of the present invention.
Figure 3B:
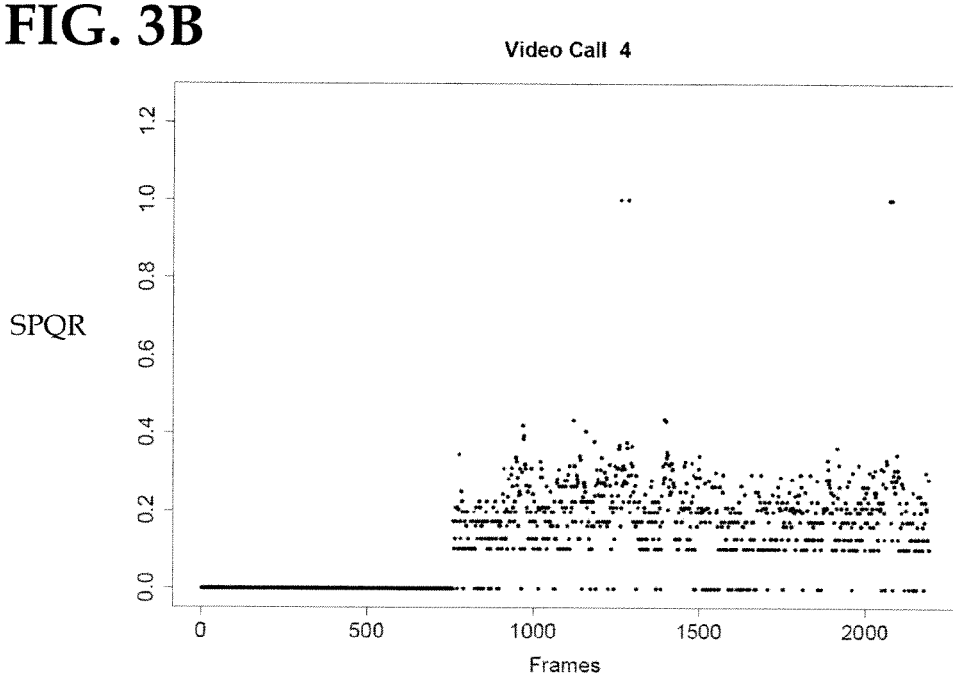
FIG. 3B illustrates exemplary SPQR over time for burst packet losses induced in a received video stream, in accordance with an embodiment of the present invention.

Detection of video quality degradation proceeded by computing SPQR scores frame by frame for each video call. The full frame rate for the calls was 25 fps, hence 25 SPQR values were computed for each second. Exemplary SPQR values for a sample of the video calls considered are shown in FIG. 3A for random packet loss, and in FIG. 3B for exemplary burst packet loss. FIGS. 3A and 3B show that the exemplary SPQR on the Y-axis substantially accurately detects video quality degradation that was injected approximately 20 seconds (500 frames) into a call. FIGS. 3A and 3B show that after an initial degradation, exemplary SPQR values only occasionally fall back to the zero level indicating no degradation. This behavior may be attributed to loss of frame synchronization. Additional degradation caused spikes in the SPQR values.

Figure 4A:
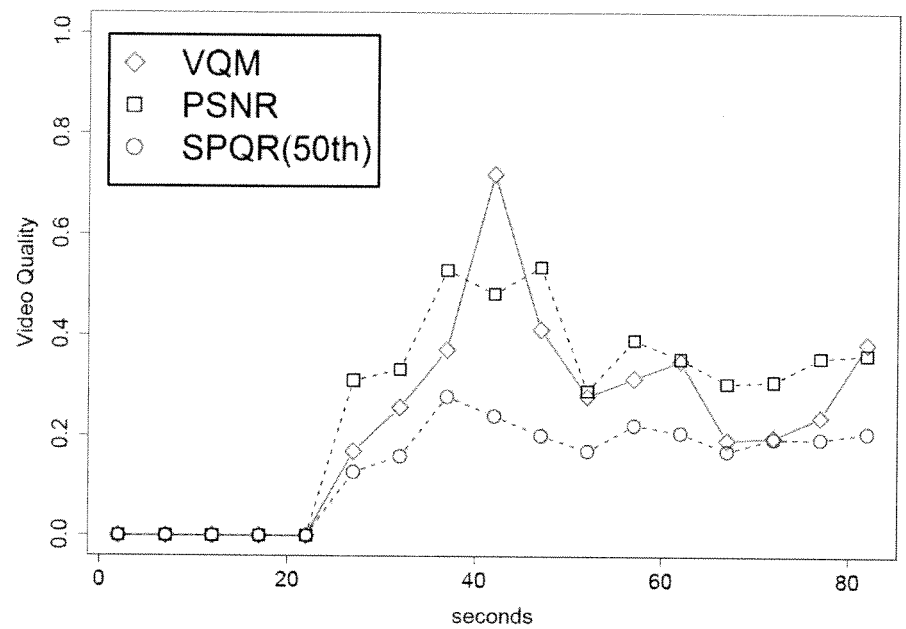
FIG. 4A illustrates an exemplary comparison of video quality over time as calculated by several methods for random packet losses induced in a received video stream, in accordance with an embodiment of the present invention.
Figure 4B:
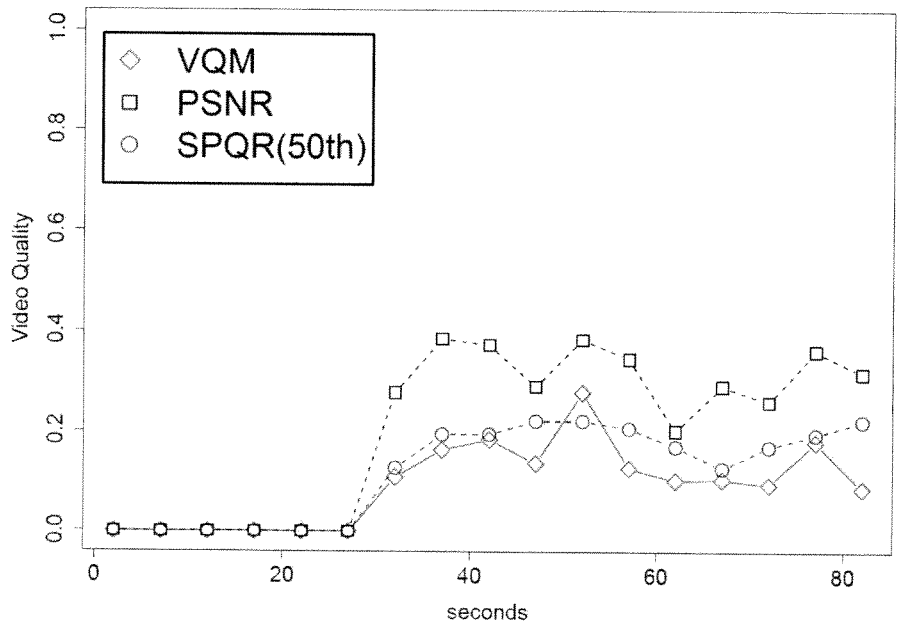
FIG. 4B illustrates an exemplary comparison of video quality over time as calculated by several methods for burst packet losses induced in a received video stream, in accordance with an embodiment of the present invention.

A comparison of VQM and PSNR was conducted, an exemplary sample of which is illustrated in FIGS. 4A-4B. The performance of SPQR to VQM and PSNR was compared over five second intervals. VQM scores were computed for each five second interval using the VQM software. The ffmpeg utility was used to generate the raw video input to the VQM software.

PSNR values were computed for each sent and received frame pair. The PSNR values were summarized at five second intervals by selecting the median value among the PSNR values corresponding to the time interval. Similarly, for each five second interval, the median SPQR score was selected for the frames matching the time interval.

VQM was used as a descriptor of video quality since it incorporates subjective user opinion. Linear regression was used to assess how well SPQR tracked VQM scores. Additionally, VQM scores were modeled using PSNR values. R2 values of the regression results (also known as $R^2$ values) were used as an indicator of the goodness of fit. Linear regression was conducted for each video call, rather than modeling all of the calls, because SPQR was used to detect relative degradation within a call in order to initiate appropriate action. The first 20 seconds were not used for regression analysis since video quality degradation was not injected during that time. Each five second interval was summarized using the 50th, 75th, and the 90th percentile SPQR values. The 50th percentile values resulted in the highest R2 goodness of fit values for modeling the VQM scores for the corresponding intervals. In the video calls that were considered, the median R2 goodness of fit value was 0.9 indicating that SPQR tracks VQM closely.

Modeling VQM scores using the PSNR values resulted in a median R2 value of 0.93. PSNR closely tracked VQM in the tested videos because the video content involved low motion and a single speaker. In video calls, video degradation is likely to happen around the face area, and such errors are likely to be noticed by users. In the test dataset, PSNR detected errors that would be considered noticeable when measured by VQM.

FIGS. 4A and 4B show an exemplary comparison of metrics for a sample of the tested video calls. Video calls with the best, average, and maximum R2 goodness of fit values were selected. VQM scores are shown with diamonds. PSNR figures are shown with squares. For SPQR, linear regression results using the 50th percentile values are shown with circles. The plots and the R2 values indicate that the lightweight SPQR metric relatively closely tracked more computationally and resource-intensive metrics such as VQM and PSNR.

Figure 5:
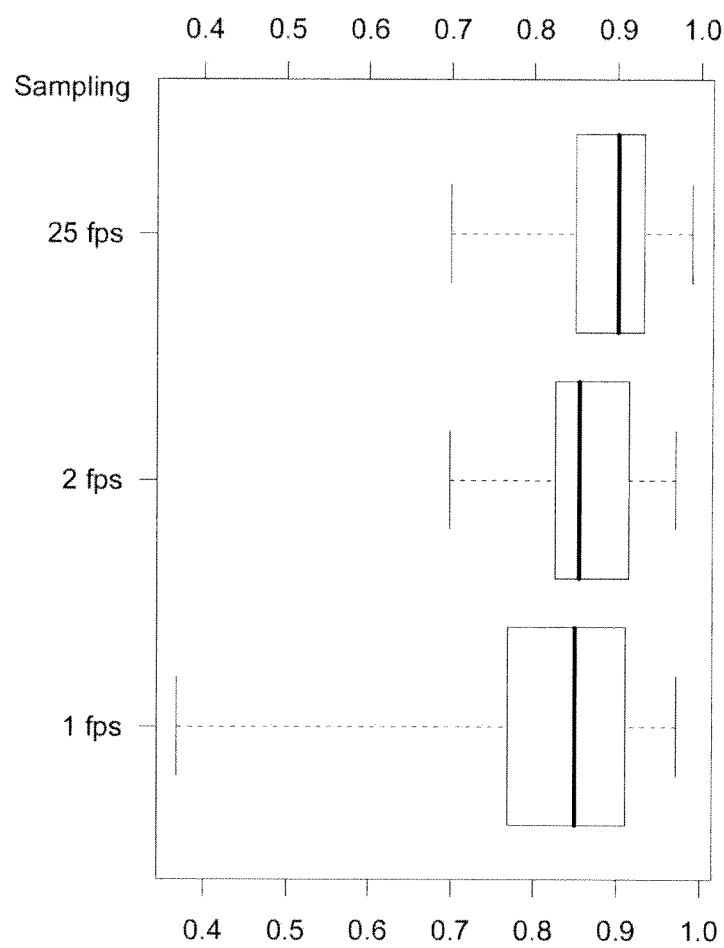
FIG. 5 illustrates accuracy of modeling with different sampling rates, in accordance with an embodiment of the present invention.

SPQR video quality sampling rate was investigated. Face detection times discussed above indicate that median time to compute an SPQR score is 174 ms. Therefore, in order to keep a computational overhead relatively low, SPQR may be recomputed about once or twice per second. Impact of recomputing SPQR once or twice per second upon accuracy of video quality measurements was assessed, compared to recomputing SPQR for each frame of the video (e.g., re-computing SPQR for each frame of a video having a video frame rate of 25 fps is akin to video quality sampling at 25 fps). To determine SPQR values matching 1 fps video quality sampling, every ith frame every second for SPQR computation was selected, where $1 \leq i \leq 25$ was selected randomly. SPQR values for 2 fps sampling was selected similarly. Linear regression was conducted to model VQM scores every five seconds using the SPQR values selected using low-grade sampling. FIG. 5 is a plot illustrating accuracy of modeling with different sampling rates, with sampling rate on the Y-axis and R2 on the X-axis. FIG. 5 shows that higher sampling rates yield higher R2 values. However, the medians of the R2 distributions of these sampling rates are comparable. Therefore, sampling at the rate of 1 fps is sufficient for detecting video quality degradation.

Experiments described above show that face locations can be determined in real-time by sampling a few frames every second. SPQR is a reduced-reference metric that requires minimal transmission overhead between the sender and receiver through a separate channel to communicate the reduced features.

In another embodiment in accordance with the present invention, face detection capability may be usable with image capture through an outside camera (i.e., a remotely-located camera accessible via a communication path such as a WAN or the Internet). While subtle degradation may not be detected due to the remotely-located camera being outside of the video system, the presence and/or absence of a face can be detected.

In another embodiment in accordance with the present invention, use of cameras outside of the video system (i.e., remotely-located cameras) enables potential new uses. For instance, a real-time video monitoring application may flag times when a face that should be in the picture cannot be detected. Example actions may include recording frames during the flagged times for later view, triggering extra monitoring actions, and so forth.

Compared to metrics based on network packet level measurements, embodiments in accordance with the present invention are essentially independent of the video coder used, and as such are more general. Compared to image processing based heavy-weight metrics, embodiments in accordance with the present invention incur much less computational and transmission overhead.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to detect video quality degradation in a video stream received by a telecommunications endpoint, the method comprising:
    locating reference features characteristic of content in the received video stream;
    calculating, by use of a processor, reduced reference features from the located reference features;
    receiving reduced reference features of a transmitted video stream, the transmitted video stream corresponding to the received video stream;
    calculating, by use of a processor, a coordinate distance between the reduced reference features in the received video stream and the reduced reference features of the transmitted video stream; and
    detecting video quality degradation when the calculated coordinate distance exceeds a predetermined threshold.

2. The method of claim 1, wherein reference features characteristic of content comprise faces.

3. The method of claim 1, wherein reduced reference features comprise locations of the reference features.

4. The method of claim 1, wherein the reduced reference feature comprises a location of a rectangular area surrounding the reference feature.

5. The method of claim 1, wherein the reduced reference features are calculated at less than a full frame rate of the received video stream.

6. The method of claim 1, wherein the reduced reference features are calculated at no more than two frames per second.

7. The method of claim 1, wherein the reduced reference features of the transmitted video stream are received via a communication channel that is separate from a communication channel used to transport the video stream.

8. The method of claim 1, further comprising:
    receiving a frame of the transmitted video stream to the telecommunications endpoint, once per second, via a reliable channel; and
    calculating reduced reference features from the transported frame.

9. The method of claim 1, wherein calculating a coordinate distance comprises calculating the coordinate distance in accordance with the following relationship:

$$distance = \frac{\log\left(\sqrt{(x_s - x_r)^2 + (y_s - y_r)^2}\right)}{\log(d_{max})},$$

wherein:
    $(x_r, y_r)$ comprises received coordinates of a reduced reference features in the received video stream;
    $(x_s, y_s)$ comprises received coordinates of a reduced reference features in the transmitted video stream; and
    $d_{max}$ comprises a diagonal resolution size.

10. The method of claim 1, wherein the video stream originates from a remotely-located camera accessible via a communication path.

11. The method of claim 1, further comprising: detecting an absence of reference feature from the received video stream.

12. A system to detect video quality degradation in a video stream received by a telecommunications endpoint, the method comprising:
    a location module configured to locate reference features characteristic of content in the received video stream;
    a processor configured to calculate reduced reference features from the located reference features;
    a receiver configured to receive reduced reference features of a transmitted video stream, the transmitted video stream corresponding to the received video stream;
    a processor configured to calculate a coordinate distance between the reduced reference features in the received video stream and the reduced reference features of the transmitted video stream; and
    a detector configured to detect video quality degradation when the calculated coordinate distance exceeds a predetermined threshold.

13. The system of claim 12, wherein reference features characteristic of content comprise faces.

14. The system of claim 12, wherein the reduced reference feature comprises a location of a rectangular area surrounding the reference feature.

15. The system of claim 12, wherein the reduced reference features are calculated at less than a full frame rate of the received video stream.

16. The system of claim 12, wherein the reduced reference features are calculated at no more than two frames per second.

17. The system of claim 12, wherein the reduced reference features of the transmitted video stream are received via a communication channel that is separate from a communication channel used to transport the video stream.

18. The system of claim 12, wherein the processor is configured to calculate a coordinate distance in accordance with the following relationship:

$$\text{distance} = \frac{\log\left(\sqrt{(x_s - x_r)^2 + (y_s - y_r)^2}\right)}{\log(d_{max})},$$

wherein:
- $(x_r, y_r)$ comprises received coordinates of a reduced reference features in the received video stream;
- $(x_s, y_s)$ comprises received coordinates of a reduced reference features in the transmitted video stream; and
- $d_{max}$ comprises a diagonal resolution size.

19. The system of claim 12, wherein the video stream originates from a remotely-located camera accessible via a communication path.

20. The system of claim 12, further comprising: a detection module configured to detect an absence of reference feature from the received video stream.

* * * * *